United States Patent [19]

Kersenbrock et al.

[11] Patent Number: 4,789,789

[45] Date of Patent: Dec. 6, 1988

[54] EVENT DISTRIBUTION AND COMBINATION SYSTEM

[75] Inventors: Michael D. Kersenbrock; David A. Lowry, both of Aloha; Gregory D. Harris, Hillsboro; Michael D. Henry; Francis D. Kohlmeier, both of Portland, all of Oreg.

[73] Assignee: Tektronix, Inc., Beaverton, Oreg.

[21] Appl. No.: 830,596

[22] Filed: Feb. 17, 1986

[51] Int. Cl.$^4$ .............................................. H02J 1/00
[52] U.S. Cl. ....................................... 307/40; 307/38; 290/40 R; 340/310 R; 340/825.06; 365/239
[58] Field of Search ............... 364/135, 136, 173, 177, 364/422, 494, 551, 492, 164, 717; 340/825.65, 825.69, 870.13, 521, 657, 676; 60/39, 281, 646, 39, 27; 346/20, 60; 365/239; 376/287, 283, 293, 254, 255, 207, 209, 215, 216, 217, 240, 242, 245, 251, 250, 259; 290/2, 4 R, 40 R, 40 C; 370/97, 83, 62, 13, 14, 94, 93, 104, 80; 307/35–41; 375/83, 87, 96, 106, 109, 110, 119

Primary Examiner—William M. Shoop, Jr.
Assistant Examiner—Paul Ip
Attorney, Agent, or Firm—Daniel J. Bedell; Robert S. Hulse

[57] ABSTRACT

An apparatus for generating trigger signals responsive to a selected pattern of event detection signals, the apparatus comprising an interim function bus, programmable means to selectively energize conductors of the interim function bus on detection of the selected event detection signal pattern, and programmable means to generate the trigger signal on detection of a selected pattern of interim function bus signals. The generating means are programmed for pattern recognition by binary data appearing on control lines from a shift register, the shift register being loaded by serial data from external control circuits. The apparatus also includes provisions for synchronizing the generation of signal patterns on the interim function bus to a system clock, and for synchronizing the generation of trigger signals to clocks associated with triggerable devices.

16 Claims, 4 Drawing Sheets

EVENT DISTRIBUTION AND COMBINATION SYSTEM

BACKGROUND OF THE INVENTION

The present invention relates in general to electrical control systems and in particular to an apparatus for logically combining, synchronizing and distributing event detection signals for triggering purposes.

Electrical control systems typically employ sensors to produce digital indicating signals on detection of various external evehts. The indicating signals are then logically combined to produce triggering signals to control triggerable devices. Complex systems typically employ many such event detectors to provide the necessary information to control many such triggerable devices. Often, however, it is not possible to locate the event detectors and the trigger circuitry in the same equipment module, such as a circuit board, and in complex systems extensive wiring between equipment modules is often required to interconnect event detection and trigger control circuitry. Further, events and triggers are often synchronous signals within an equipment module, with each module having its own independent clock, and it is often difficult to synchronize events and triggers associated with different modules.

Multiplexing systems have been developed to reduce the amount of control circuitry whereby control signals appearing at many locations in one equipment module have been converted to serial data for transmission over a single wire pair to remote equipment modules. Such multiplexing has been effective particularly in reducing interpanel wiring between equipment racks in large control systems. However, parallel-to-serial multiplexing systems typically employ complex circuitry, do not lend themselves to interconnecting triggering signals between small equipment modules and are unsuitable for high speed operation.

What is needed is a means for logically interconnecting event detectors and triggerable devices in a control system which minimizes the amount of interconnecting wiring and which provides for synchronization of differently clocked events and triggers.

SUMMARY OF THE INVENTION

According to one aspect of the invention, a control system, comprising separate equipment modules wherein each equipment module contains or interfaces one or more event detectors, is provided with one or more event logic units which produce a set of digital output signals of states dependent on logical combinations of input signals from the event detectors. The output signals of the event logic units are placed on an "interim function bus" comprising a set of lines interconnecting each module in the system in parallel. Each equipment module of the control system containing or interfacing one or more triggerable devices is provided with one or more triggering logic units, each of which produces a triggering signal of a state dependent on selected logical combinations of signals occurring on the lines of the interim function bus. The event logic units compactly encode event information conveyed by a large number of event indicating signals into a parallel code carried between modules on a relatively small parallel bus and the triggering logic units decode this code to initiate triggering.

According to another aspect of the invention, each event logic unit and each triggering logic unit is programmable such that the triggering signal produced by each triggering logic unit may result from occurrence of any selected combination of event detection signals, and such that the selected combination may be easily changed.

According to still another aspect of the invention, each circuit module containing an event or triggering logic unit is provided with a controller for generating signals used to program the logic units. The controllers on each module are interconnected by a second bus permitting an operator to reprogram the event detection and triggering logic units from a centralized operator interface device such as a computer terminal.

According to a further aspect of the invention, each signal from an event detector is delayed by an event synchronizing circuit prior to application to an event logic circuit until the occurrence of a pulse on a system clock bus. Similarly, the output of each triggering logic unit is delayed by a trigger synchronizing circuit until the next occurrence of a clock pulse from the triggerable device. This aspect of the invention permits coordination of events and triggering when operation of equipment modules, events and triggerable devices are all synchronized to different clocks.

It is accordingly an object of the present invention to provide a new and improved event distribution and combination apparatus which minimizes the amount of interconnection wiring needed to interface event detectors and triggerable devices.

It is another object of the present invention to provide a new and improved event distribution and combination apparatus to generate trigger signals on occurrence of selected combinations of event detection signals.

It is still another object of the present invention to provide a new and improved event distribution and combination apparatus which may be easily programmed and reprogrammed to produce trigger signals in response to selected combinations of events.

It is a further object of the present invention to provide a new and improve event distribution and combination apparatus for providing synchronization of event detection signals to a system clock and for providing synchronization of triggering signals to the clocks of triggerable devices.

The subject matter of the present invention is particularly pointed out and distinctly claimed in the concluding portion of this specification. However, both the organization and method of operation together with further advantages and objects thereof may best be understood by reference to the following description taken in connection with accompanying drawings wherein like reference characters refer to like elements.

DRAWINGS

DETAILED DESCRIPTION

Figure 1:
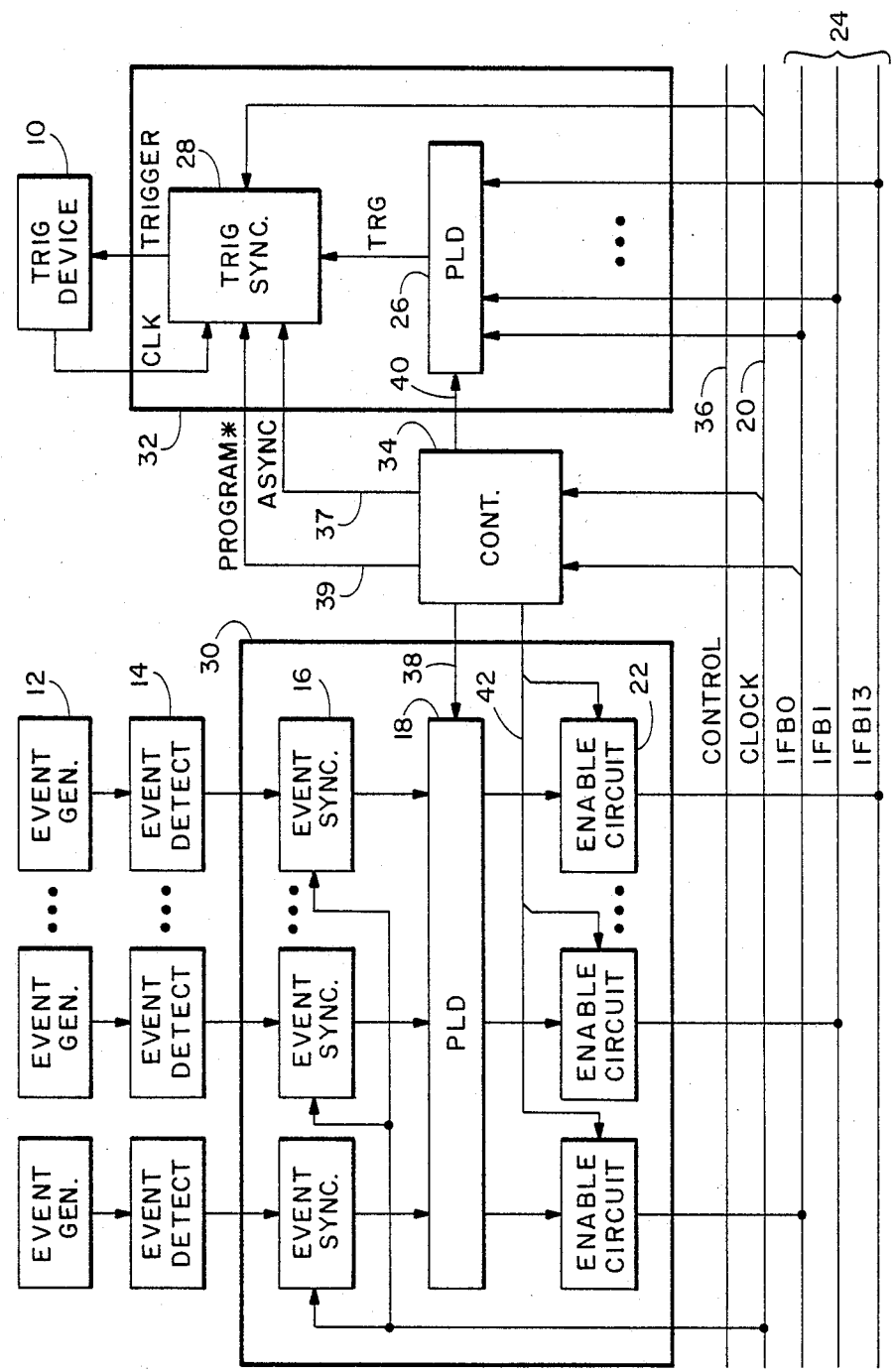
FIG. 1 is a block diagram of an event distribution and combination system in accordance with the present invention.

Referring to FIG. 1, an event distribution and combination system, illustrated in block diagram form, is adapted to transmit one or more triggering signals (TRIGGER) to triggerable devices 10 in response to predetermined patterns of input event indicating signals generated by a set of event detectors 14 in response to events occurring in generating devices 12. The present invention is adapted to minimize the amount of wiring required to interconnect event detectors 14 and triggerable devices 10 in applications where the event detectors and triggerable devices are mounted on or accessed through separate equipment modules, such as circuit boards. The present invention is also adapted to synchronize event detection and triggering communication between modules when the modules operate under independent clocks.

The event distribution and combination system includes one or more event logic units 30 mounted on each module receiving event indicating signals from one or more event detectors 14, and one trigger logic unit 32 mounted on each module for each triggerable device 10 accessed by the module. One controller 34 is also mounted on each module containing one or more event or trigger logic units. All of the event logic units 30 and trigger logic units 32 are interconnected in parallel by an "interim function" bus (IFB) 24 comprising a set of 14 lines for carrying encoded information between modules.

Each event logic unit 30 monitors the event indicating signals produced by up to six event detectors 14 and may be programmed to place predetermined patterns of signals on the interim function bus 24 in response to one or more particular patterns of input event indicating signals. Each trigger logic unit 32 monitors the states of the IFB 24 lines and may be programmed to generate its output TRIGGER signal on detection of one or more predetermined bit patterns on the IFB 24. The controllers 34 on each module generate control signals applied to the event logic units 30 and trigger logic units 32. These control signals program the pattern generation and recognition operation of the event logic units 30 and trigger logic units 32 on the module. Each controller 34 is accessed by another bus 36 which carries programming data to the controller 34 from an external operator interface device, such as a microcomputer system.

The present invention minimizes the amount of intermodule wiring required to coordinate input events with output trigger signals by making efficient use of the interim function bus 24. A 14 line interim function bus is capable of carrying many different bit patterns. Each event logic unit 30 can be programmed to produce any one of these bit patterns in response to particular patterns of input event indicating signals and each trigger logic unit 32 may be programmed to produce a TRIGGER signal in response to any bit pattern on the interim function bus. By careful preprogramming of the event and trigger logic units, the event distribution and combination system can coordinate many event/triggering actions involving many separate equipment modules using only the 14 interconnecting lines of the IFB 24.

Each event logic unit 30 comprises six event synchronizer circuits 16 for receiving output signals from event detectors 14, one programmable logic device (PLD) 18 for receiving output signals from the six event synchronizers 16, and fourteen enable circuits 22, each interposed between one of the fourteen output terminals of programmable logic device 18 and one line of the fourteen line IFB 24. The event synchronizer circuits 16 synchronize event indicating signals to a system clock by delaying transmission of event indicating signals to PLD 18 until receipt of a pulse from the system clock (CLOCK) signal which is carried to each event synchronizer circuit on a system clock line 20. Clock line 20 may be controlled by any suitable source of clock pulses of frequency which may be independent of clocks used to time the operation of any module, event generator or triggerable device.

PLD 18 transmits a separate binary output signal to each of fourteen corresponding enable circuits 22, the state of each output signal being set in response to the pattern of input signal states from event synchronizers 16. The relationships between PLD 18 output signal states and input signal patterns are determined by control signals on control lines 38 from controller 34. Each enable circuit 22 has a single binary output which is connected to one of the 14 lines (IFB0-IFB13) of the interim function bus 24. Each enable circuit has four operating modes and the mode of operation is controlled by control lines 42 from controller 34. In one mode of operation, the enable circuit produces an output of the same state as its input, while in a second mode the enable circuit inverts its input to produce an output. In a third operating mode, the enable circuit 22 maintains its output in a continuously low state regardless of the state of the input while in a fourth mode the enable circuit maintains its output in a continuously high state.

All fourteen lines of IFB 24 are coupled to programmable logic device 26 of triggering logic unit 32. Each triggering logic unit 32 comprises one programmable logic device (PLD) 26, having inputs receiving each line of the IFB 24. PLD 26 produces an output signal (TRG) in response to a particular pattern of input signals from the IFB 24, the pattern being determined by control data on control lines 40 from controller 34. Each triggering logic unit 32 also comprises a trigger synchronizing circuit 28 for receiving the TRG signal from PLD 26 and for transmitting the TRIGGER signal to the triggerable device 10 in response to the TRG signal from PLD 16. If triggerable device 10 operation is synchronized to its own clock, the trigger synchronizing circuit 28 generates the TRIGGER signal on the leading edge of the first pulse of a clock signal (CLK) provided by the triggerable device 10 following detection of the TRG signal by the synchronizing circuit. If triggerable device 10 is to operate asynchronously, an "ASYNC" signal on a control line 37 from controller 34 to the trigger synchronizing circuit 28 causes the synchronizing circuit to immediately pass the TRG input signal as the TRIGGER signal to the triggerable device 10 without synchronization to the CLK signal.

Controller 34 suitably comprises a shift register and a bus interface circuit for storing data from control bus 36 in the shift register. The shift register of controller 34 produces a parallel set of output bits on control lines 37, 38, 40 and 42 after receiving the same set of bits in serial form over a serial data line of bus 36. Since the shift register in controller 34 is loaded one bit at a time as it receives clock pulses on clock line 20, the control data applied to each programmable device continuously changes during reprogramming and each programmable device passes through a succession of interim states wherein the device has unintended input/output relationships which can lead to generation of unexpected TRG signals. By freezing the state of the TRIGGER signal output of each synchronizing circuit 28 prior to reprogramming the system, the changes in the TRG signals may be prevented from inadvertently triggering any triggerable device. The controller 34 preserves the state of the TRIGGER signal output of each trigger synchronizing circuit 28 of FIG. 1 during reprogramming by deasserting a PROGRAM* signal on control line 39 to the trigger synchronizing circuit 28, the PROGRAM* signal being continuously asserted when the system is not being reprogrammed. The PROGRAM* signal is carried to each controller 34 by control bus 36 and is forwarded to the trigger synchronizing circuits on control line 39 by the controller 34.

Figure 2:
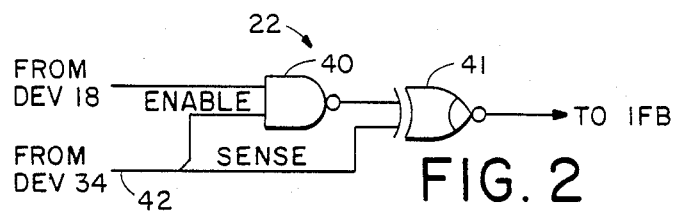
FIG. 2 is a block diagram of the enable circuit of FIG. 1.

FIG. 2 depicts an enable circuit 22 of FIG. 1 in more detail. Enable circuit 22 comprises a NAND gate 40 and an exclusive NOR (XNOR) gate 41. NAND gate 40 has one input terminal for an output bit from PLD 18 and has a second input terminal for an ENABLE signal from controller 34 over one of control lines 42. The output of NAND gate 40 is applied to one input of XNOR gate 41 while a SENSE signal from controller 34 is transmitted to a second input of XNOR gate 41 over a second control line 42. The output of XNOR gate 41 is coupled to one line of IFB 24. If the ENABLE signal from controller 34 is low, the output of NAND gate 40 will be high, regardless of the state of the input signal from DEV 18. Therefore, controller 34 can block any effect on the enable circuit 22 output due to the PLD 18 input signal by holding the ENABLE line low. On the other hand, with the enable line from controller 34 high, the state of the NAND gate 40 output will be the inverse of the state of the input signal from PLD 18.

If both inputs of XNOR gate 41 are the same logic level (both high or both low), the gate output is high, while if the two inputs are of differing logic levels, the XNOR gate output level is low. If the SENSE signal from controller 34 is high, then the output state of XNOR gate 41 will be equal to the output state of NAND gate 40. If the SENSE signal from controller 34 is low, XNOR gate 41 will invert the output of NAND gate 40. Thus, depending on the states of the SENSE and ENABLE control signals applied to enable circuit 22, the output state of circuit 22 may be equal to the state of the data input from PLD 18, may be the inverse of the data input state, or may be high or low regardless of the state of the input data.

Figure 3:
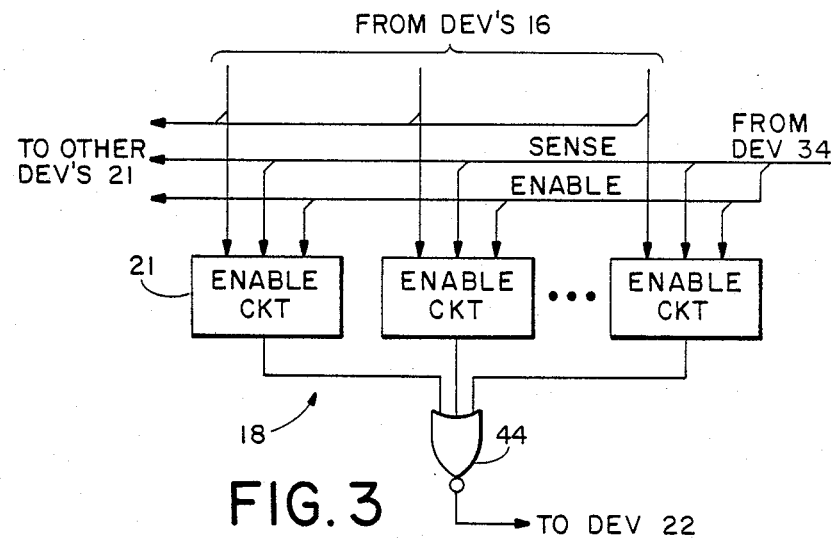
FIG. 3 is a block diagram of a portion of the programmable logic device of the event logic unit of FIG. 1.

FIG. 3 depicts a preferred embodiment of a portion of programmable logic device 18 of FIG. 1. PLD 18 comprises fourteen NAND gates 44, each summing the outputs of a corresponding set of six enable circuits 21, identical to enable circuits 22 of FIG. 2. Only one NAND gate 44 and its associated set of enable circuits 21, are shown in FIG. 3. Each enable circuit 21 of each set receives the output of one of the six event signals from synchronizer circuits 16 of FIG. 1, the output of any one event synchronizer circuit 16 being tied in common to the input of one enable circuit associated with each of the fourteen NAND gates 44. Enable circuits 22 permit controller 34 to program PLD 18 by controlling the states of the ENABLE and SENSE control lines to each enable circuit 21 such that each enable circuit 21 may selectively pass, invert or block signals from an associated event synchronizing circuit 16, selectively applying either a high or a low voltage to the associated input of any NAND gate 44 when the event signals are blocked. Therefore, PLD 18 can be programmed to produce an output signal of a selected state on each IFB 24 line on occurrence of any selected pattern of data signals from synchronizer circuits 16.

Figure 4:
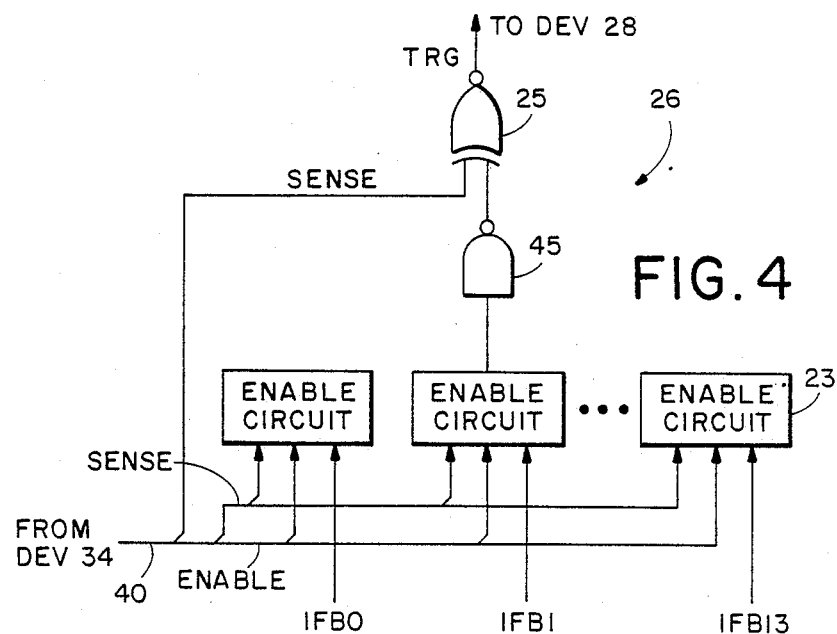
FIG. 4 is a block diagram of a portion of the programmable logic device of the trigger logic unit of FIG. 1.

Programmable logic device 26 of trigger logic unit 32 of FIG. 1, depicted in more detailed block diagram form in FIG. 4, comprises a set of fourteen enable circuits 23 similar to previously described enable circuits 22 of FIG. 2, each coupling one line of IFB 24 to one input of a fourteen input NAND gate 45. The output of NAND gate 45 is applied as one input signal to an XNOR gate 25 while a SENSE control signal on control line 40 from controller 34 is applied to nother input of the XNOR gate. The output of XNOR gate 25 provides the input signal (TRG) to synchronizing circuit 28. In the same manner as controller 34 uses SENSE end ENABLE signals on lines 42 to program the operation of PLD 18 of FIG. 3, controller 34 can program PLD 26 to produce a trigger signal of either sense on detection of any selected bit pattern on IFB lines by appropriately setting the states of the SENSE and ENABLE signals on lines 40 applie to enable circuits 23 and XNOR gate 25 of PLD 26.

Figure 5:
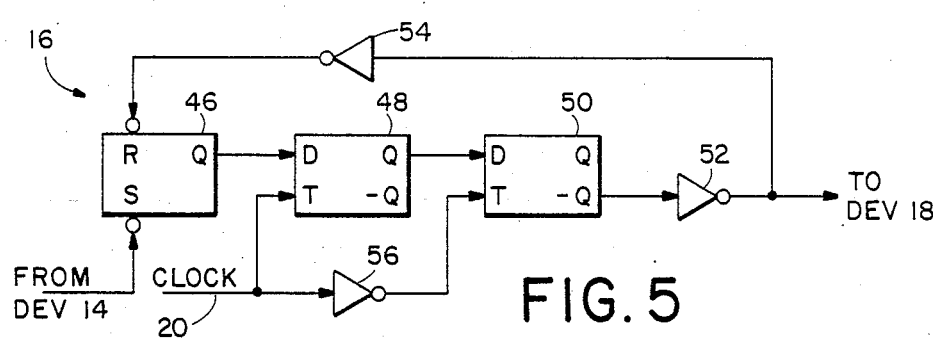
FIG. 5 is a block diagram of one of the event synchronizing circuits of FIG. 1.

The preferred embodiment of event synchronizing circuit 16 of FIG. 1, depicted in more detail in FIG. 5, comprises RS flip-flop 46, type D flip-flops 48 and 50, and inverters 52, 54 and 56. RS flip-flop 46 output Q is set to a high (logical 1) state when the SET input S of the flip-flop is set to a low (logical 0) state. Flip-flop 46 output Q is reset to a logical 0 when the reset input R is set to a logical 0. D type flip-flops 48 and 50 each produce logical 1 Q outputs and logical 0−Q outputs whenever a logical 1 appears at the D input on the rising edge of a CLOCK pulse applied to the T input. If the D input is low during a rising edge of the CLOCK pulse, the Q output is reset to 0 and the −Q output is reset to 1.

An input signal from event detector 14 of FIG. 1 is applied to the set input of RS flip-flop 46. The Q output of flip-flop 46 is applied to the D input of flip-flop 48 while the Q output of flip-flop 48 is connected to the D input of flip-flop 50. The −Q output of flip-flop 50 is inverted by inverter 52 and becomes the synchronizer output signal to PLD 18 of FIG. 1. Also, the output of inverter 52 is in turn inverted by inverter 54 and applied to reset terminal R of RS flip-flop 46. A CLOCK signal on clock line 20 is connected to the T input of flip-flop 48 and the same clock signal is inverted by inverter 56 and applied to the T input of flip-flop 50. Therefore flip-flop 48 changes state only on the rising edge of a clock pulse on line 20, while flip-flop 50 changes state only on the falling edge of a clock pulse on line 20.

Assuming that both the set and reset inputs of flip-flop 46 are initially high, that the Q output is low, that the output of the synchronizer at inverter 52 is low, and that the input to flip-flop 46 from event detector 14 is driven low, indicating occurrence of an event, then the Q output of flip-flop 46 latches in high state. On the next rising edge of a CLOCK pulse on line 20, flip-flop 48 changes state, driving its Q output high. Then, on the falling edge of the next pulse on line 20, flip-flop 50 changes state, driving the −Q output low. The output of inverter 52 goes high causing inverter 54 to drive the inverting reset input of flip-flop 46 low to reset the Q output of flip-flop 46 when the inverting set input goes high again. If the set input is still low, flip-flop 46 will remain set until the set input does go high. With flip-flop 46 reset, flip-flop 48 resets on the next leading edge of a system CLOCK pulse, causing flip-flop 50 to reset on the falling edge of the next system CLOCK pulse, thereby driving the event synchronizing circuit 16 output at inverter 52 low again.

Thus flip-flop 46 latches on a signal from an event detector 14, while the combination of flip-flops 48 and 50 synchronizes the transmission of an event signal to PLD 18 until the start of the next CLOCK pulse and ensures that the event signal to PLD 18 remains high for at least one clock cycle. The signal from event detector 14 need remain on only long enough to set flip-flop 46 and the double clocking of flip-flops 48 and 50 provides protection against metastable input states and provides synchronization of the event indication to the system clock.

Figure 6:
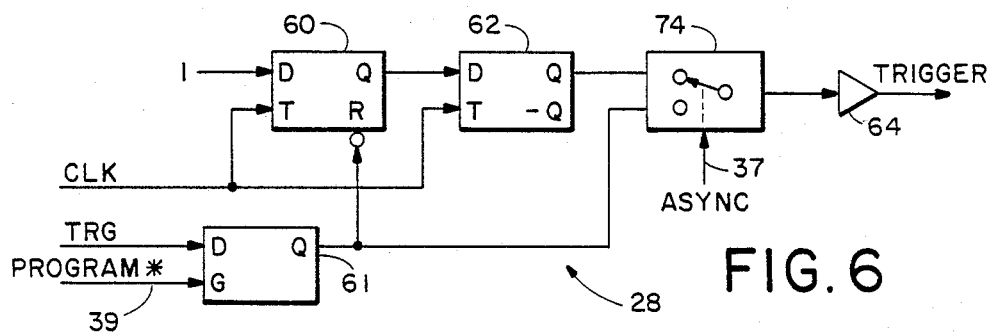
FIG. 6 is a block diagram of the trigger synchronizing circuit of FIG. 1.

Trigger synchronizing circuit 28 of FIG. 1, shown in more detailed block diagram form in FIG. 6, comprises type D flip-flops 60 and 62, a transparent latch 61, a switch 74, and a driving amplifier 64 for producing the TRIGGER signal to triggerable device 10 of FIG. 1. The TRG signal from the PLD 26 of FIG. 1 drives a D input of transparent latch 61 while the PROGRAM* signal on control line 39 from the controller 34 of FIG. 1 controls a G input of latch 61. The transparent latch 61 transfers the state of the TRG signal at its D input to its Q output when the G input is high and freezes the state of the Q output when the G input goes low. Therefore when the PROGRAM* signal is deasserted during a system reprogramming operation, the TRG signal has no effect on the Q output of latch 61 so that the state of the TRIGGER signal remains fixed. The ASYNC signal from controller 34 controls the switching state of switch 74 which connects the Q output of latch 61 to the input of amplifier 64 on assertion of the ASYNC signal on control line 37, applied as a switching control input to switch 74. Thus when the triggerable device 10 of FIG. 1 is to operate asynchronously, the ASYNC line is asserted and a TRG signal appearing at the Q output of latch 61 is routed immediately to the input of amplifier 64 to initiate the TRIGGER signal output of the amplifier.

The Q output of latch 61 is also connected to an inverting reset input of flip-flop 60, the D input of latch 60 being tied to a logic level "1" source and the T (clock) input of latch 60 being controlled by the CLK signal from the triggerable device. The Q output of flip-flop 60 drives the D input of flip-flop 62 while the CLK signal from triggerable device 10 controls the T input of flip-flop 62. Switch 74 connects the Q output of flip-flop 62 to the input of amplifier 64 when the ASYNC signal on control line 37 is not asserted and the triggerable device 10 of FIG. 1 is to be operated synchronously.

The TRIGGER signal output of amplifier 64 is intended to trigger a triggerable device as the TRIGGER signal goes low. In the synchronous mode of triggering, as long as the TRG signal from PLD 26 remains high, the Q outputs of flip-flops 60 and 62 remain high, the output of switch 74 remains high, and the TRIGGER signal remains high. When a TRG signal from PLD 26 goes low, indicating that PLD 26 has determined device 10 should be triggered, flip-flop 60 immediately resets, driving its Q output low. On the next rising edge of a CLK pulse from the TRG device, flip-flop 62 resets, driving its Q output and the output of switch 74 low causing amplifier 64 to generate the active low TRIGGER signal to triggerable device 10. As long as the TRG signal from PLD 26, applied to the reset input of flip-flop 60, remains low, trigger synchronizing circuit 28 will continue to generate a low TRIGGER signal to the triggerable device 10. On the next CLK pulse rising edge after the TRG signal from pLD 26 returns to a high state, flip-flop 60 sets. Then, on the next subsequent CLK pule rising edge, flip-flop 62 sets, driving the Q output of flip-flop 62 high, driving the switch 74 output high, thereby turning off (driving high) the TRIGGER signal generated by driver amplifier 64. Therefore, trigger synchronizing circuit 28 initiates and terminates TRIGGER signals to triggerable device 10 synchronized with the CLK pulses from the triggerable device when the ASYNC signal on line 37 is held low.

The event distribution and combination system of the present invention provides three levels of programmable logic which enable selected combinations of events detected by event detectors 14 to trigger selected combinations of triggerable devices 10 mounted in physically separate component modules, thereby to reduce the amount of intermodule wiring. Each level of programmable logic is designed to accept a plurality of binary inputs and to produce a single binary output, the state of the output being determined by any desired combination of input states. Generally, each level of programmable logic includes the equivalent of a first group of enable circuits, a NAND or an AND gate, and an additional enable circuit. Each enable circuit of the first group receives one input signal and produces an output signal which may be programmed to be of the same or inverse logic level to its input signal, or held continuously high or low regardless of the state of its input signal. The outputs of the first group are combined with a NAND (or AND) gate and the output of the NAND (or AND gate) is applied as input to the additional enable circuit which produces a single bit output. This arrangement permits any desired pattern of input signals to trigger a single output signal of either state.

Figure 7:
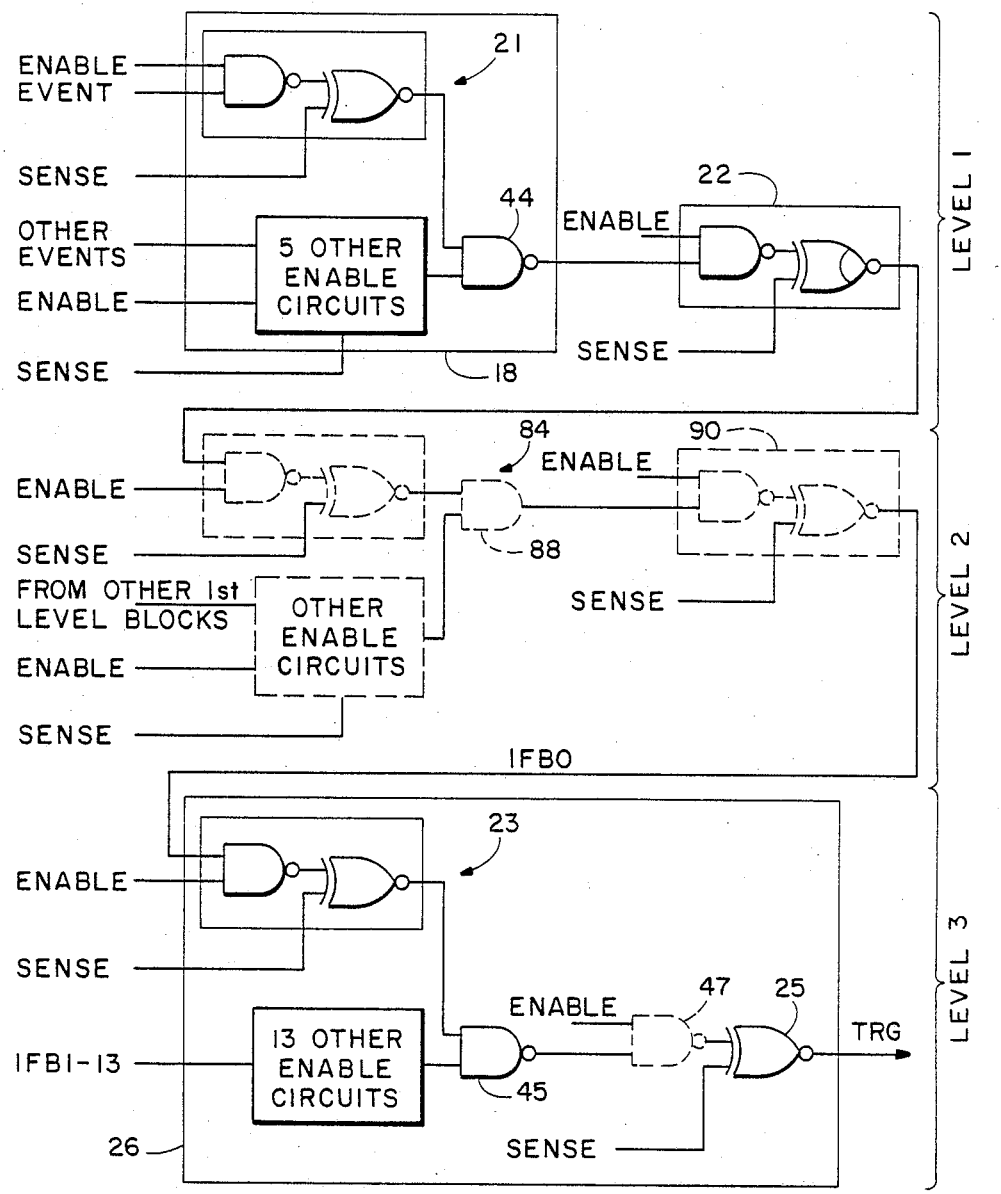
FIG. 7 is a block diagram illustrating the levels of programmability of the event combination and distribution system of the present invention.

Referring to FIG. 7, the first level of programmability (Level 1) comprises each PLD 18 in each module in combination with the enable circuits 22. Each PLD 18 includes fourteen sets of six enable circuits 21, one set associated with each line of the interim function bus. One such set, associated with bus line IFB0 is illustrated in FIG. 7. Each set of enable circuits 21 receives up to six event indicating inputs from the event detectors and the six outputs of the enable circuits 21 are applied as inputs to a NAND gate 44. The output of NAND gate 44 is applied to the input of enable circuit 22 which provides the signal output for controlling IFB0. Thus the first level of programmability is capable of driving each line of the IFB high or low in response to any desired combination of input event indicating signal states, or continuously high or low regardless of states of the input events.

For convenience, the discussion of the second level of programmability will follow the discussion of the third level of programmable logic. The third level (Level 3) of programmability is provided by every PLD 26 in the system, each of which includes a set of fourteen enable circuits 23, each receiving one of the IFB0-13 lines as inputs, a NAND gate 45 for receiving the outputs of the enable circuits 23, and an XNOR gate 25 for receiving the output of the NAND gate 45 and for producing the TRG signal. In an alternative embodiment of the present invention, another NAND gate 47 (shown in dotted line) is inserted between the output of NAND gate 45 to provide enable conditioning of the output of NAND gate 45 such that NAND gate 47 and XNOR gate 25 comprise a complete enable circuit. With NAND gate 47 in place, PLD 26 can produce a TRG signal of state determined by any combination of states on the IFBO-13 lines or (when the enable signal to NAND gate 47 is held low) which is continuously high or low regardless of the state of the IFB lines. However, this can be done by deasserting all of the enable signal inputs to enable circuits 23. Therefore, NAND gate 47 is omitted from the PLD 18 in the preferred embodiment of the invention without reduction in utility.

The second level (Level 2) of programmability has all of the outputs of Level 1 as its inputs and produces all of the inputs to Level 3 as its outputs. Each Level 2 output is of a state which may be determined by the states of a selected combination of several Level 1 outputs, or may be held continuously high or low. In an alternative embodiment of the invention, Level 2 programmability is provided by a set of enable circuits 84, each receiving the output of one enable circuit 22 of one module 30. The outputs of the enable circuits 84 are provided as inputs to an AND gate 88, and the output of AND gate 88 is connected to an input of an enable circuit 90. The output of enable circuit 90 drives one of the IFB lines, in the example case, IFBO. Thus the second level of programmability can set the state of any one of the IFB lines according to any combination of Level 1 output states from modules 30 or can set the IFB line continuously high or low regardless of the module 30 output states. However since each enable circuit 22 is connected in series with an enable circuit 84, no loss of programming flexibility occurs when the enable circuit 84 in bypassed because enable circuit 22 can be programmed to produce any desired input to AND gate 88 in response to the output of NAND gate 44 which could be produced by enable circuits 22 and 84 series. By a similar argument, enable circuit 90 can also be eliminated without loss of programming flexibility since it is in series with enable circuit 23. Finally, AND gate 88 is eliminated in the preferred embodiment of the invention because the open collector outputs of enable circuits 22 can be directly connected to the IFB, thereby providing a "hardwired" AND of these outputs. Thus while Level 2 programmability exists in the preferred embodiment of the invention and provides additional flexibility in relating events to triggering signals, the second level of programmability is provided without additional hardware by accounting for the lack of enable circuits 84 and 90 in the programming of enable circuits 22 and 23 and by hardwire ANDing the outputs of enable circuits 22 onto the IFB bus lines.

With the three levels of programmable logic, the system may be programmed with flexibility to independently trigger many triggerable devices 10 upon occurrence of many possible combinations of events, within limits generally determined by the size of IFB 24. As IFB 24 lines are increased in number the number of separately distinguishable bit patterns which can be simultaneously transmitted by IFB 24 also increases, permitting more devices to be independently triggered at the same time.

It should be noted that Level 1 may be bypassed in alternative embodiments of the invention by coupling the output of each of the event synchronizers 18 to the interim function bus through a separate enable circuit 22. Similarly, Level 3 may be omitted by connecting selected lines of IFB 24 directly to the inputs of trigger synchronizing circuits 28. In either case triggerable device 10 may be triggered on any combination of signals from event detectors 14. However inclusion of Level 1 and Level 3 programming permits an increase in the efficiency of use of IFB 24 and in the flexibility of the system in permitting simultaneous triggering upon occurrence of many separate event combinations.

Thus, in addition to providing synchronization between event and triggering signals, the event distribution and combination system of the present invention minimizes the amount of wiring needed to interconnect event detectors and triggerable devices mounted in separate component modules by providing a relatively small interface bus to interconnect the modules, and three levels of programmability for efficiently encoding and decoding triggering data carried on the interface bus. In the preferred embodiment of the invention, separate equipment modules are mounted in a common mainframe and the interim function bus is provided as back plane wiring interconnecting the modules. Since the maximum length of interim function bus 24 which can be utilized to interconnect separate equipment modules is limited when high frequency operation is required, it is usually preferable to provide a separate event distribution and combination system, including a separate interface bus within each mainframe of a multiple-frame system and to provide a set of TRIGGER signal outputs from each mainframe as event signal inputs to the other mainframes. The unidirectional TRIGGER signals are more easily adapted for long distance transmission than the bidirectional IFB bus signals and since each TRIGGER signal output of a mainframe can represent any selected combination of event inputs to the ainframe, a group of TRIGGER signals transmitted to another mainframe can be encoded to efficiently carry triggering information between mainframes in much the same way that the IFB bus is encoded to efficiently carry triggering information between modules within a mainframe. Thus the present invention is easily adapted for efficiently communicating event information between mainframes as well as between modules within a single mainframe.

While a preferred embodiment of the present invention has been shown and described it will be apparent to those skilled in the art that many changes and modifications may be made without departing from the invention in its broader aspects. For example, while the preferred embodiment of the invention is intended for use with a fourteen line interim function bus 24, other embodiments of the invention may employ other numbers of IFB lines. Similarly, while event signals are applied to each PLD 18 in groups of six, other group sizes are possible. The appended claims are therefore intended to cover all such changes and modifications as fall within the true spirit and scope of the invention.

We claim:

1. An apparatus for generating a trigger signal in response to a set of event indication signals, a state of each of said set of event indication signals indicating a state of occurrence of an event, the apparatus comprising;

a programmable encoing circuit for receiving said set of event indication signals and for generating a set of parallel event encoding signals, each event encoding signal being of a state representing a logical combination of states of a programmably determined subset of said set of event indication signals;

a plurality of conductors for carrying said set of event encoding signals; and a programmable decoding circuit for generating said trigger signal on detection of a predetermined pattern of states of said event encoding signals carried on a programmably determined subset of said conductors.

2. An apparatus according to claim 1 wherein said programmable encoding circuit comprises:

a first plurality of programmable enable circuits, each of said first plurality of programmable enable circuits receiving one of said set of event indication signals and generating an output signal in response to said one event indication signal and in response to a first programming control signal, the output signal being of a state similar to a state of the one event indication signal when the first programming control signal is of a first state, being of a state opposite to the state of the one event indication signal when the first programming control signal is of a second state, being of a high logic level when the first programming control signal is of a third state, and being of a low logic level when the first programming control signal is of a fourth state; and a plurality of logic gates, each for logically combining output signals generated by said programmable enable circuits to produce a logic gate output signal.

3. An apparatus according to claim 2 wherein said first programming control signal comprises a binary enable signal and a binary sense signal, and wherein at least one of said first plurality of enable circuits comprises:

a NAND gate having one of said event indication signals and said enable signal as inputs; and an XNOR gate, having an output of said NAND gate and said sense signal as inputs, for generating an enable circuit output signal.

4. An apparatus according to claim 2 wherein said programmable encoding circuit further comprises a second plurality of programmable enable circuits, each of said second plurality of programmable enable circuits receiving as input one logic gate output signal and generating as output one event encoding signal in response to said one logic gate output signal and in response to a second programming control signal, the one event encoding signal being of a state similar to a state of said one logic gate output signal when the second programming control signal is of a first state, being of a state opposite to the state of said one logic gate output signal when the second programming control signal is of a second state, being of a high logic level when the second programming control signal is of a third state, and being of a low logic level when the second programming control signal is of a fourth state.

5. An apparatus according to claim 4 wherein said second programming control signal comprises a second binary enable signal and a second binary sense signal, and wherein at least one of said second plurality of enable circuits comprises:

a NAND gate having one of said event indication signals and said second enable signal as inputs; and an XNOR gate having an output of said NAND gate and said second sense signal as inputs for generating an enable circuit output signal.

6. An apparatus according to claim 1 wherein said programmable decoding circuit comprises:

a plurality of programmable enable circuits, each receiving one of said event encoding signals carried on said conductors, and generating an output signal in response to said one event encoding signal and in response to a programming control signal, the output signal being of a state similar to the state of said one event encoding signal when the programming control signal is of a first state, being of a state differeing from the state of said one event encoding signal when the progamming control signal is of a second state, being of a high logic level when the programming control signal is of a third state, and being of a low logic level when the programming control signal is of a fourth state; and a logic gate for logically combining the output signals of said programmable enable circuits to produce said trigger signal.

7. An apparatus according to claim 6 wherein said programming control signal comprises a binary enable signal and a binary sense signal, and wherein at least one of said plurality of enable circuits comprises:

a NAND gate having one of said event indication signals and said enable signal as inputs; and an XNOR gate, having the output of said NAND gate and said sense signals as inputs, for generating an enable circuit output signal.

8. An apparatus for generating a trigger signal in response to a set of first event indication signals, a state of each first event indication signal indicating a state of occurrence of a corresponding event, the apparatus comprising:

a plurality of event synchronizing circuits, each receiving one of said first event indication signals and an input system clock signal, and generating a second event indication signal synchronized to said system clock signal following receipt of said one first event indication signal;

a programmable encoding circuit receiving a set of said second event indication signals generated by said plurality of event synchronizing circuits, and generating a set of parallel event encoding signals, each event encoding signal being of a state representing a logical combination of the states of a programmably determined subset of said set of second event indication signals;

a plurality of conductors for carrying said set of event encoding signals; and a programmable decoding circuit for generating said trigger signal on detection of a predetermined pattern of states of said event encoding signals carried on a programmably determined subset of said conductors.

9. An apparatus for generating a trigger signal in response to a set of event indication signals, a state of each event indication signal indicating a state of occurrence of a corresponding event, the apparatus comprising:

a programmable encoding circuit receiving a set of said event indication signals and generating a set of parallel event encoding signals, each event encoding signal being of a state representing a logical combination of states of a programmably determined subset of said set of event indication signals;

a plurality of conductors for carrying said set of event encoding signals;

a programmable decoding circuit for generating an output trigger signal on detection of a predetermined pattern of states of said event encoding signals carried on a programmably determined subset of said conductors; and a trigger synchronizing circuit for receiving the output of said programmable decoding circuit and a triggering clock signal, and for generating said trigger signal synchronized to said triggering clock signal following receipt of said programmable decoding circuit output signal.

10. An apparatus for generating a trigger signal in response to a set of first event indication signals, a state of each first event indication signal indicating a state of occurrence of a corresponding event, the apparatus comprising:

a plurality of event synchronizing circuits, each receiving one of said first event indication signals and an input system clock signal, and generating a second event indication signal synchronized to said system clock signal following receipt of said one first event indication signal;

a programmable encoding circuit for receiving a set of second event indication signals generated by said plurality of event synchronizing circuits and for generating a set of parallel event encoding signals, each event encoding signal being of a state representing a logical combination of states of a programmably determined subset of said second event indication signals;

a plurality of conductors for carrying said set of event encoding signals;

a programmable decoding circuit for generating an output signal on detection of a predetermined pattern of states of said event encoding signals carried on a programmably determined subset of said conductors; and a trigger synchronizing circuit for receiving the output signal of said programmable decoding circuit and an input triggering clock signal, and for generating said trigger signal synchronized to said triggering clock signal following receipt of said programmable decoding circuit output signal.

11. An apparatus for generating a plurality of trigger signals in response to a plurality of sets of event indication signals, the state of each binary event indication signal indicating a state of occurrence of a corresponding event, the apparatus comprising:

a plurality of programmable encoding circuits, each for receiving one of said sets of said event indication signals and for generating a first set of parallel event encoding signals, each event encoding signal being of a state representing a logical combination of the states of a programmably selected subset of said one set of event indication signals;

means for logically combining the plurality of first sets of parallel event encoding signals generated by said encoding circuits to form a single second set of parallel event encoding signals, each signal of the second set being of a state representing a logical combination of states of signals of one of the first sets; and a plurality of programmable decoding circuits, each for generating one of said trigger signals on detection of a predetermined pattern of signal states in a programmably determined subset of said second set of event encoding signals.

12. An apparatus acording to claim 11 wherein at least one of said programmable encoding circuits comprises:

a first plurality of programmable enable circuits, each receiving one of said event indication signals and generating an output signal in response to said one event indication signal and in response to a first programming control signal, the output signal being of a state similar to a state of said one indication signal when the first programming control signal is of a first state, being of a state differing from the state of said one event indication signal when the first programming control signal is of a second state, being of a high logic level when the first programming control signal is of a third state, and being of a low logic level when the first programming control signal is of a fourth state; and a plurality of logic gates, each for logically combining output signals of said programmable enable circuits to produce a logic gate output signal.

13. An apparatus according to claim 12 wherein said first programming control signal comprises a binary enable signal and a binary sense signal, and wherein at least one of said first plurality of enable circuits comprises:

a NAND gate having one of said event indication signals and said enable signal as inputs; and an XNOR gate, having an output of said NAND gate and said sense signal as inputs, for generating an enable circuit output signal.

14. An apparatus according to claim 12 wherein said at least one programmable encoding circuit further comprises a second plurality of programmable enable circuits, each for receiving one logic gate output signal and for generating one event encoding signal in response to said one logic gate output signal and in response to a second programming control signal, the state of the event encoding signal being of a state similar to a state of said one logic gate output signal when the second programming control signal is of a first state, being of a state differing from the state of said one logic gate output signal when the second programming control signal is of a second state, being of a high logic level when the second programming control signal is of a third state, and being of a low logic level when the second programming control signal is of a fourth state.

15. An apparatus according to claim 14 wherein said second programming control signal comprises a second binary enable signal and a second binary sense signal, and wherein at least one of said second plurality of enable circuits comprises:

a NAND gate having one of said event indication signals and said second enable signal as inputs; and an XNOR gate having an output of said NAND gate and said second sense signal as inputs for generating an enable circuit output signal.

16. An apparatus according to claim 14 wherein at least one of said programmable decoding circuits comprises:

a first plurality of programmable enable circuits, each receiving one of said event encoding signals and for generating an output signal in response to said one event encoding signal and in response to a third programming control signal, the output signal being of a state similar to a state of said one event encoding signal when the third programming control signal is of a first state, being of a state differing from the state of said one event encoding signal when the third programming control signal is of a second state, being of a high logic level when the third programming control signal is of a third state, and being of a low logic level when the third programming control signal is of a fourth state; and a logic gate for logically combining the output signals of said programmable enable circuits to produce one of said plurality of trigger signals.

* * * * *